United States Patent [19]

Kikuchi

[11] 4,320,496
[45] Mar. 16, 1982

[54] TONE ARM RETURN SYSTEMS FOR RECORD PLAYER WITH ECCENTRIC SPINDLE HOLE IMMUNITY

[75] Inventor: Takashi Kikuchi, Tokorozawa, Japan

[73] Assignee: Pioneer Electronic Corporation, Tokyo, Japan

[21] Appl. No.: 890,761

[22] Filed: Mar. 27, 1978

[30] Foreign Application Priority Data

Mar. 26, 1977 [JP] Japan ................................ 52/33881

[51] Int. Cl.$^3$ ............................................ G11B 17/06
[52] U.S. Cl. .................................................... 369/226
[58] Field of Search ............................ 274/1 L, 15 A

[56] References Cited

U.S. PATENT DOCUMENTS

| | | | |
|---|---|---|---|
| 3,599,984 | 8/1971 | Tatsuo | 274/1 L |
| 3,717,818 | 2/1973 | Herbst | 307/353 X |
| 3,820,033 | 6/1974 | Iwata | 307/353 |
| 3,937,903 | 2/1976 | Osann | 274/15 R X |
| 3,976,947 | 8/1976 | Guyot et al. | 328/114 X |
| 4,041,404 | 8/1977 | Lewis | 328/114 X |

Primary Examiner—Charles E. Phillips
Attorney, Agent, or Firm—Sughrue, Mion, Zinn, Macpeak & Seas

[57] ABSTRACT

A first generator 1 produces a continuously increasing signal corresponding to the tone arm pick-up stylus position, and a second generator 2 produces a synchronizing signal comprising a pulse for each turntable rotation. The synchronizing pulses alternately trigger a pair of parallel sample and hold circuits 4a, 4b supplied with the position signal, whose differential output S is compared with a reference signal T. When the former exceeds the latter the tone arm is returned. Any cyclical variations in the position signal due to the eccentricity of the record spindle hole are self-cancelling during the differential comparison because their magnitudes are substantially the same when sampled during the same relative periods of the turntable rotation cycle. The high pitch of the lead-out groove at the end of the record play produces a large differential output signal, to thereby trigger the tone arm return.

In a second embodiment a variable amplitude pulse generator is employed whose turntable revolution synchronized output pulses each have an amplitude corresponding to the instantaneous tone arm position. Such pulses thus serve the dual functions of providing synchronized gating signals and indicating the rotational position of the tone arm.

3 Claims, 11 Drawing Figures

TONE ARM RETURN SYSTEMS FOR RECORD PLAYER WITH ECCENTRIC SPINDLE HOLE IMMUNITY

BACKGROUND OF THE INVENTION

This invention relates to methods and apparatuses for detecting the end of a performance in a record player by discriminating variations in the pitch of the record groove.

With a record player, reproduction is carried out by moving a pick-up cartridge needle along the spiral groove of a record placed on a rotating turntable. Most modern record players employ automatic tone arm return systems. In one of such systems the tone arm return is initiated by detecting the arrival of the pick-up at a position which lies at a predetermined distance from the center of the turntable. In another system the increased pitch of the lead-out groove of a record is utilized. That is, increments in the differentiated output of a signal which varies in correspondence to the radial movement of the pick-up are detected to thereby discriminate the end of a performance and return the tone arm.

The former system is disadvantageous in that when a record whose lead-out groove is relatively close to the outer circumference is used, the automatic return function does not work. In contrast, when a record whose lead-out groove is relatively close to the center is used, the tone arm will be returned before the performance is ended.

In the latter system if the spindle hole in the center of the record is not exactly coincident with the center of the recording groove, the tone arm oscillates one cycle during each revolution of the record due to the eccentricity of the hole. As a result, the output signal corresponding to the position of the pick-up also varies or oscillates. Accordingly, if an increment of the radial pick-up movement speed is detected by differentiating this signal, an output increment $Q_1$ (FIG. 1) obtained when the signal varies in a positive direction due to the eccentricity of the record is greater than the average increment $Q_2$, and such an artificially high differentiation output leads to a premature and erroneous return operation.

SUMMARY OF THE INVENTION

Briefly, and in accordance with a first embodiment of the present invention, the drawbacks and disadvantages of the prior art are effectively overcome by generating a continuously increasing signal corresponding to the tone arm pick-up stylus position, and a synchronizing signal comprising a pulse for each turntable rotation. The synchronizing pulses alternately trigger a pair of parallel sample and hold circuits supplied with the position signal, whose differential output is compared with a reference signal. When the former exceeds the latter the tone arm is returned. Any cyclical variations in the position signal due to the eccentricity of the record spindle hole are self-cancelling during the differential comparison because their magnitudes are substantially the same when sampled during the same relative periods of the turntable rotation cycle. The high pitch of the lead-out groove at the end of the record play produces a large differential output signal, to thereby trigger the tone arm return.

In a second embodiment a variable amplitude pulse generator is employed whose turntable revolution synchronized output pulses each have an amplitude corresponding to the instantaneous tone arm position. Such pulses thus serve the dual functions of providing synchronized gating signals and indicating the rotational position of the tone arm.

DETAILED DESCRIPTION OF THE PREFERRED EMBODIMENTS

Figure 1:
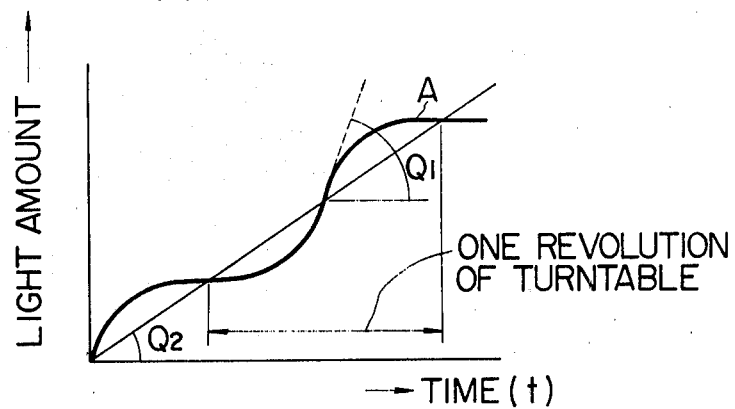
FIG. 1 shows a graphical representation of the tone arm return signal characteristics in a conventional record player.
Figure 2:
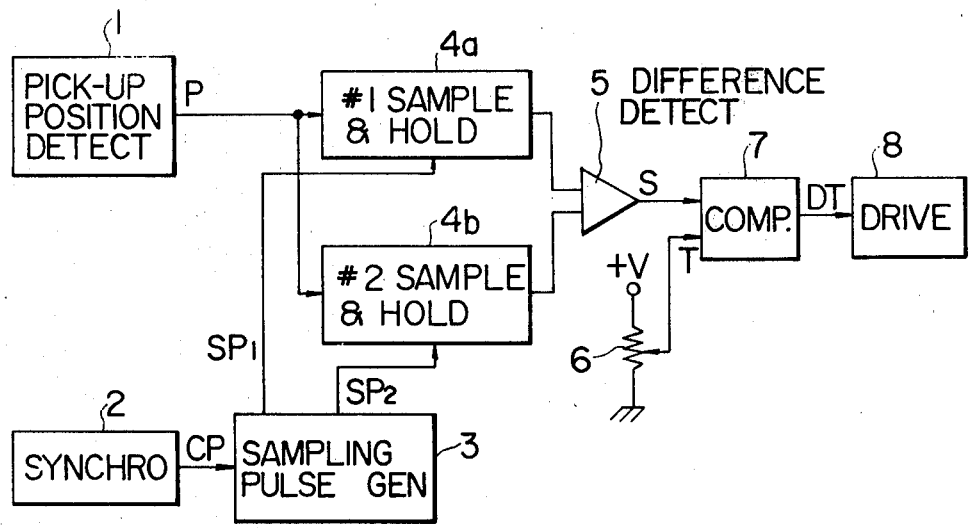
FIG. 2 shows a block diagram of a record player tone arm return system according to a first embodiment of this invention.

Referring to FIG. 2, a pick-up position signal generator 1 is adapted to generate a position signal P. The generator 1 may comprise a photo-coupler system, for instance, in which the quantity of light applied to a receiving element is controlled by a shutter which is turned in association with a rotary tone arm shaft. A synchronizing signal generator 2 is adapted to generate a pulse CP in synchronization with each revolution of a turntable. The generator 2 may operate by detecting light reflected by a small area on the bottom of the turntable, or by subjecting an oscillating motor drive signal to frequency division. A sampling pulse generator 3 alternately produces sampling pulses $SP_1$ and $SP_2$ when the synchronizing pulse CP is applied thereto. A first sample and hold circuit 4a samples the position signal P when the sampling pulse $SP_1$ is applied thereto, and holds the sampled value at its output. Similarly, a second sample and hold circuit 4b samples and holds the instantaneous value of the position signal P in response to the sampling pulse $SP_2$. The outputs of the first and second sample and hold circuits are subjected to comparison by a difference detector 5, to thereby provide a difference signal S. A reference value setting variable resistor 6 provides a reference signal T. A comparator 7 generates a lead-out groove detection signal DT only when the absolute value of the difference signal S is greater than the reference signal T. A drive section 8 implements the tone arm return in response to the lead-out groove detection signal DT.

In operation, the pick-up stylus at the end of the tone arm is placed in the groove of a record on the turntable to perform reproduction, and the tone arm, being guided by the groove spiral, is gradually swung toward the center of the record. A light shielding plate turned in association with the tone arm controls the quantity of light applied to the position signal generator 1, and such light quantity increases as play continues and the tone arm advances radially toward the record center. If the spindle hole is properly centered, i.e. not eccentric, a linear light quantity increase results, as shown by line A in FIG. 3(a), and a corresponding linearly increasing position signal P is produced by the generator 1. On the other hand, if the spindle hole is eccentric, a cyclical variation component whose amplitude is proportional to the amount of eccentricity is added, and the resultant light quantity increase varies as indicated by curve B in FIG. 3(a).

Figure 3A:
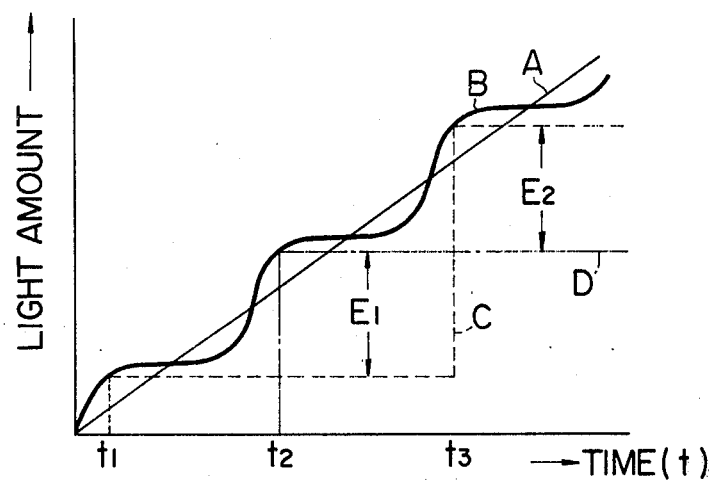
FIGS. 3(a)–3(d) show various waveform diagrams for describing the operation of the circuit shown in FIG. 2.
Figure 3B:
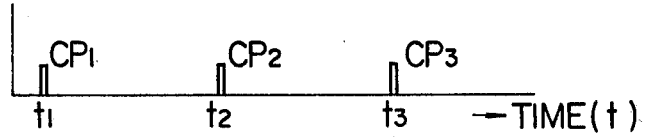
Figure 3C:
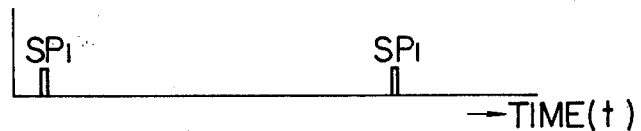
Figure 3D:
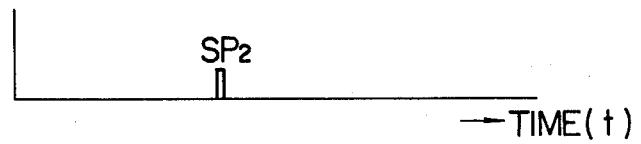
Figure 4:
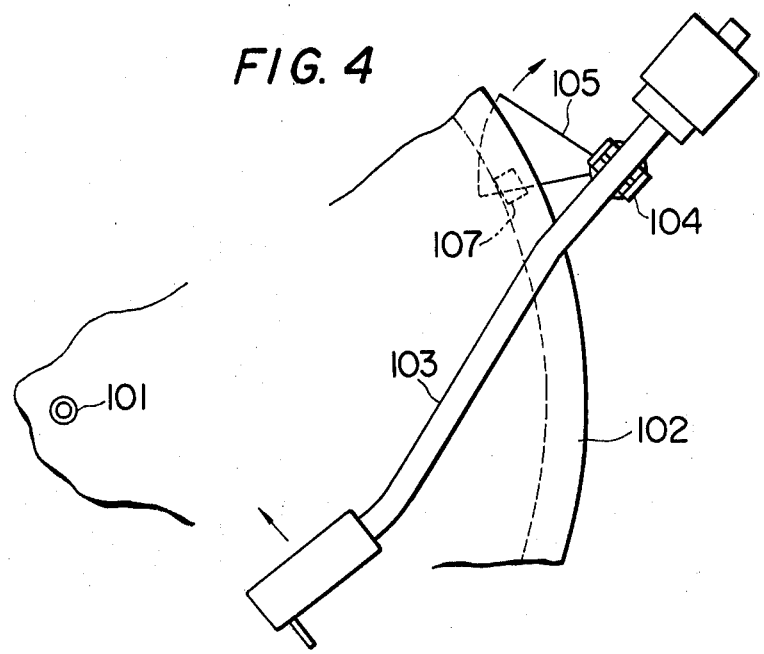
FIG. 4 shows a partial plan view of a turntable and tone arm arrangement according to a second embodiment of this invention.
Figure 5:
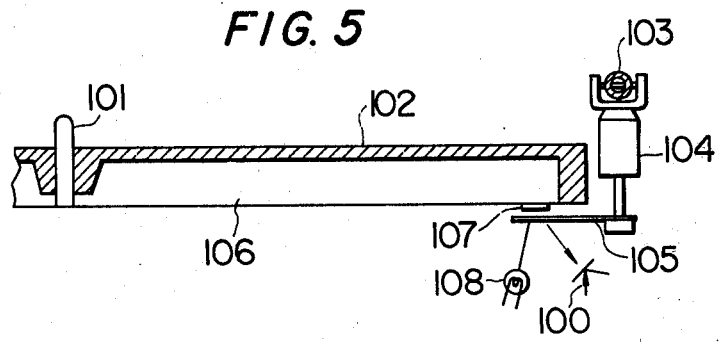
FIG. 5 shows a side sectional view of FIG. 4.

The synchronizing signal generator 2 generates synchronizing pulses $CP_1$, $CP_2$ and $CP_3$ at time instants $t_1$, $t_2$ and $t_3$, as shown in FIG. 3(b), with the period between such pulses corresponding to a turntable revolution. When the synchronizing pulses $CP_1$–$CP_3$ are applied to the sampling pulse generator 3, sampling pulses $SP_1$ and $SP_2$ are alternately generated as shown in FIGS. 3(c) and 3(d), respectively, and applied to the first and second sample and hold circuits 4a and 4b. As a result, the output of the first circuit 4a follows the staircase pattern shown by the dotted line C in FIG. 3(a), while the output of the second circuit 4b follows the section line D. The held values of the two position signals thus correspond to their instantaneous values at their respective sampling times, including the variation values caused by any record eccentricity. Since such variation components are substantially constant if sampled at the same times, no signal differential due to record eccentricity is involved between the sampled and held signal values. The outputs of circuits 4a and 4b are compared with each other in the difference detector 5, as a result of which difference signals $E_1$ and $E_2$ indicated in FIG. 3(a) are successively obtained. Since no variation component due to record eccentricity is involved, the difference signal S outputted by the detector 5 corresponds only to the record groove pitch. The difference signal S is then compared with the reference signal T in the comparator 7, and the lead-out groove detection signal DT is produced only when the difference signal exceeds the reference signal. Accordingly, if the reference signal T is set at a value corresponding to a pitch lower than the record lead-out groove pitch, the arrival at and travel of the pick-up in the lead-out groove can be positively detected and the drive section 8 actuated in response thereto to implement the tone arm return.

In the above description the pick-up position detector is photo-electric, but any equivalent type of device may be employed which can provide a signal corresponding to the position of the pick-up. Furthermore, the synchronizing pulses CP need not be generated each revolution of the turntable, but can be generated for each two or more revolutions.

Turning now to a second embodiment of the invention as shown in FIGS. 4–7, a tone arm 103 is rotatably supported on a pedestal 104 mounted adjacent the periphery of a turntable 102 rotated about a record spindle 101. A light shielding plate 105 is fixedly mounted on the tone arm shaft so that it rotates together with the tone arm. A reflector 107 such as aluminum foil or the like is mounted on the underside of the turntable flange 106, and a light source 108 is directed toward the reflector. The shielding plate 105 blocks some of the light from the source 108 reflected by the foil onto a photoelectric conversion element 100 each revolution of the turntable, the amount of such blockage being a function of the rotational position of the tone arm.

Figure 6:
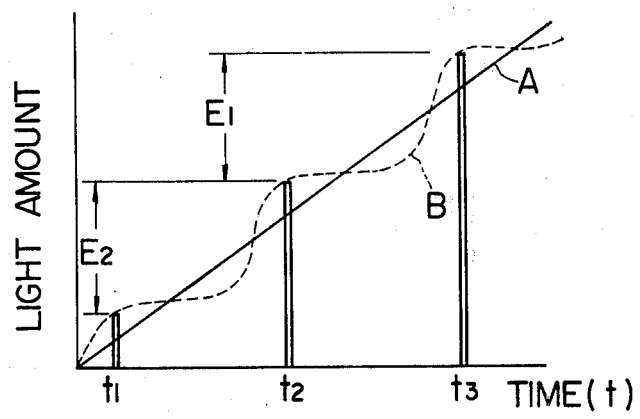
FIG. 6 shows a waveform diagram associated with the second embodiment.

The output of the conversion element 100 is thus a series of synchronized pulses as shown in FIG. 6, wherein the amplitude difference between two adjacent pulses corresponds to the rotational movement of the pick-up stylus during one revolution of the turntable.

Figure 7:
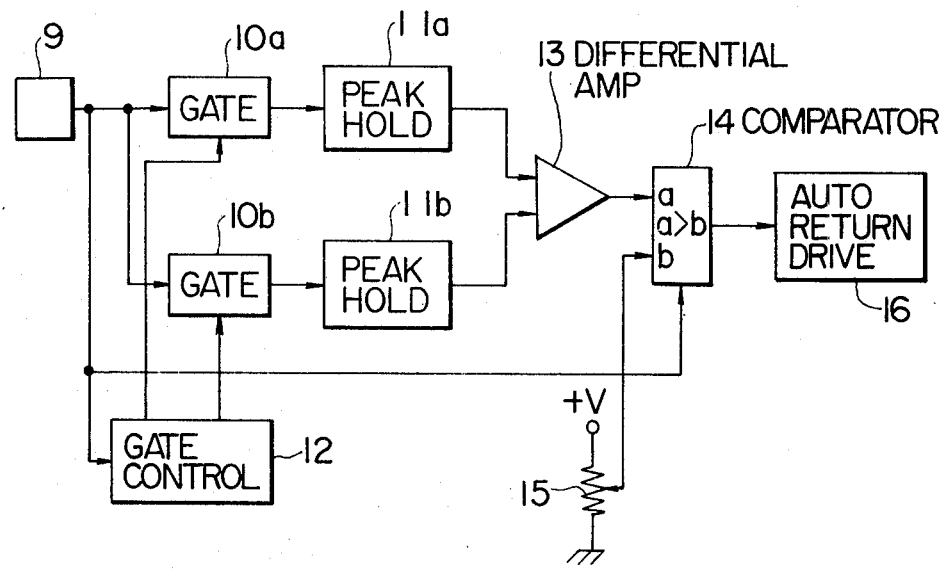
FIG. 7 shows a block diagram of a tone arm return system according to the second embodiment.

These pulses are supplied to a pair of parallel connected gates 10a, 10b as shown in FIG. 7, which are alternately opened by a gate control circuit 12 responsive to the pulses from the conversion element 100. Peak-holding circuits 11a, 11b are connected to the gates, 10a, 10b, respectively, and hold the peak values of the pulses. The held amplitude values are fed to a differential amplifier 13 whose output corresponds to the amplitude difference between the pulses. The operation thereafter, involving a comparator 14, a reference voltage source 15 and a return drive 16, is identical to the first embodiment. In this second embodiment only a single signal generator 100 is required, and its output serves the dual functions of providing synchronized gating signals and indicating the rotational position of the tone arm.

The pulse output of the generator 100 is also fed to the comparator 14 as a gate signal to prevent any spurious comparator outputs during transient or switching periods.

Figure 8:
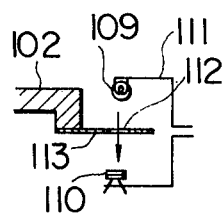
FIG. 8 shows an atternative pulse generator arrangement.

Alternatively, as shown in FIG. 8, the synchronized and proportional amplitude pulses may be generated by mounting a light source 109 and photocell 110 on opposite sides of a yoke member 111 rotated with the tone arm shaft. The light is passed through an aperture 112 in a flange plate 113 mounted on the turntable 102.

What is claimed is:

1. A tone arm return system for a record player, comprising:

a tone arm, the end of which is movable radially with respect to a spindle at the center of a rotating turntable;

a pick-up stylus mounted on the end of the tone arm and tracking a spiral groove in a record disposed on the turntable;

means for generating a train of equally spaced synchronizing pulses individually corresponding to a revolution of the turntable, the amplitude of each synchronizing pulse being proportional to the instantaneous radial position of said pick-up stylus, said means for generating comprising a light source and photocell means mounted in spaced relation and movable in accordance with the rotational swing of the tone arm as the pickup stylus tracks the record groove and an apertured shutter plate mounted on the turntable and disposed between said light source and photocell means;

means for comparing the amplitudes of successive synchronizing pulses, said comparing means comprising a pair of parallel sample and hold circuits and a differential comparator connected to their outputs, means individually supplying the synchronizing pulses to each of said sample and hold circuits and sampling pulse generator means responsive to the synchronizing pulses for alternately triggering the respective sample and hold circuits; and means for returning the tone arm to a rest position in response to the comparison value exceeding a predetermined reference value, said means for returning comprising a comparator having one input supplied with the comparison value and another input supplied with the reference value, and a tone arm drive device coupled to the output of the last-mentioned comparator.

2. A tone arm return system for a record player, comprising:

a tone arm, the end of which is movable radially with respect to a spindle at the center of a rotating turntable;

a pick-up stylus mounted on the end of the tone arm and tracking a spiral groove in a record disposed on the turntable;

means, including a photocell means whose light input is controlled by a shutter moved in accordance with the rotational swing of the tone arm as the pick-up stylus tracks the record groove, for generating a train of equally spaced synchronizing pulses individually corresponding to a revolution of the turntable and the amplitude of each synchronizing pulse being proportional to the instantaneous radial position of the pickup stylus;

means for comparing the amplitudes of successive synchronizing pulses, said comparing means comprising a pair of parallel sample and hold circuits and a differential comparator connected to their outputs, means individually supplying the synchronizing pulses to each of said sample and hold circuits and sampling pulse generator means responsive to the synchronizing pulses for alternately triggering the respective sample and hold circuits; and means for returning the tone arm to a rest position in response to the comparison value exceeding a predetermined reference value, said returning means comprising a comparator having one input supplied with the comparison value and another input supplied with the reference value, and a tone arm drive device coupled to the output of the last-mentioned comparator.

3. A tone arm return system as defined in claim 2, wherein said means for generating comprises a reflector mounted on the turntable, a light source directed at the rotational locus of said reflector, photocell means disposed to receive light from said reflector, and light shielding means moved in accordance with the rotational swing of the tone arm as the pick-up stylus tracks the record groove for controlling the light input to the photocell means as a function of the tone arm position.

* * * * *